United States Patent
Dietrich (10) Patent No.: US 8,572,942 B2
(45) Date of Patent: Nov. 5, 2013

(54) CURVED PROFILE SEED PANS

(76) Inventor: Dave Dietrich, Assiniboia (CA)

( * ) Notice: Subject to any disclaimer, the term of this patent is extended or adjusted under 35 U.S.C. 154(b) by 0 days.

(21) Appl. No.: 13/499,443

(22) PCT Filed: Sep. 23, 2010

(86) PCT No.: PCT/CA2010/001521
§ 371 (c)(1),
(2), (4) Date: Mar. 30, 2012

(87) PCT Pub. No.: WO2011/038490
PCT Pub. Date: Apr. 7, 2011

(65) Prior Publication Data
US 2012/0186215 A1  Jul. 26, 2012

(30) Foreign Application Priority Data
Oct. 1, 2009 (CA) ..................... 2681445

(51) Int. Cl.
*A01D 41/08* (2006.01)
*A01D 45/00* (2006.01)

(52) U.S. Cl.
USPC ............................................. 56/126

(58) Field of Classification Search
USPC ........... 56/119, 126, 14.4, 312, 307, 298, 128
See application file for complete search history.

(56) References Cited

U.S. PATENT DOCUMENTS

| | | | | |
|---|---|---|---|---|
| 325,109 A | * | 8/1885 | Naff | 56/127 |
| 911,017 A | * | 1/1909 | Kouns | 56/400 |
| 1,095,914 A | * | 5/1914 | Kellogg | 56/207 |
| 1,186,832 A | * | 6/1916 | Pridgen | 56/127 |
| 1,258,740 A | * | 3/1918 | Blocki | 56/313 |
| 1,368,014 A | * | 2/1921 | Bauert et al. | 56/127 |
| 1,780,985 A | | 11/1930 | Shelton | |
| 2,575,120 A | | 11/1951 | Peel | |
| 2,765,612 A | * | 10/1956 | Raumaker et al. | 56/97 |
| 2,867,961 A | * | 1/1959 | Heilbrun | 56/119 |
| 3,139,718 A | * | 7/1964 | Rickerd et al. | 56/119 |
| 3,812,661 A | * | 5/1974 | Baker | 56/14.4 |
| 3,844,094 A | * | 10/1974 | Janzen | 56/126 |
| 3,995,413 A | * | 12/1976 | Lynch | 56/119 |
| 4,204,385 A | * | 5/1980 | Taylor | 56/14.3 |
| 4,255,920 A | | 3/1981 | Janzen | |
| 4,358,921 A | * | 11/1982 | Pustejovsky | 56/34 |
| 4,589,250 A | * | 5/1986 | Faul, Jr. | 56/126 |
| 5,105,610 A | | 4/1992 | Britten | |
| 5,809,759 A | * | 9/1998 | Zyla et al. | 56/298 |

(Continued)

OTHER PUBLICATIONS

Sam Abounehme, International Search Report, Application No. PCT/CA2010/001521, Jan. 10, 2011.

*Primary Examiner* — Arpád Fábián-Kovács
(74) *Attorney, Agent, or Firm* — Akerman Senterfitt; Peter A. Chiabotti (57) ABSTRACT

A seed pan apparatus has an elongated seed pan plate with parallel right and left edges, a curved configuration and a pointed front end. An engagement mechanism attaches the plate to a harvester cutting header such that the plate is above two adjacent guard fingers, such that an open slot is defined between the right edge of one plate and the left edge of an adjacent plate and the edges of the slot are in proximity to the outer edges of the guard fingers under the adjacent plates. The point is offset to make one front tapering edge forming the point longer than the other. The inclination, height, and fore and aft position of the seed pan plate can be adjusted.

16 Claims, 9 Drawing Sheets

(56) References Cited

U.S. PATENT DOCUMENTS

| | | |
|---|---|---|
| 6,032,445 A | 3/2000 | Heintzman |
| 6,052,977 A * | 4/2000 | Goering .................... 56/34 |
| 6,094,898 A * | 8/2000 | Goering et al. .................... 56/34 |
| 6,564,536 B1 * | 5/2003 | Hoffer .................... 56/119 |
| 8,196,381 B2 * | 6/2012 | Herman et al. .................... 56/312 |
| 2004/0184905 A1 * | 9/2004 | Kinzenbaw et al. .......... 414/526 |

* cited by examiner

CURVED PROFILE SEED PANS

CROSS REFERENCE TO RELATED APPLICATIONS

This application is a §371 National Phase of PCT/CA2010/001521, filed Sep. 23, 2010, which claims priority to Canadian Patent Application No. 2,681,445, filed Oct. 1, 2009 the entirety of both of which are herein incorporated by reference.

This invention is in the field of agricultural harvesting and in particular pans for attachment to harvesting headers to catch seeds falling from plants and to prevent plant stalks from falling to the ground when cut.

BACKGROUND

The knife on a typical cutting header of an agricultural harvester, such as a combine or crop mower, comprises a knife assembly comprising a knife bar extending along the front lower edge of the header, with triangular knife sections attached along the bar such that the apex of the triangle extends forward from the bar. The exposed side edges of the knife sections are sharpened. The knife assembly also includes guards attached to the front lower edge of the header that serve to protect the knife sections from breakage when contacting stones and like obstructions. The guards comprise pointed guard fingers extending forward, and the knife moves back and forth along the edge of the header in a slot cut laterally through the guard fingers. In addition to protecting the knife, the guard fingers also enable the knife sections to cut the crop. As the knife section moves back and forth it pushes crop against the sides of those portions of the guard finger that are above and below the slot, shearing the crop stalks.

Much loss often occurs in straight cut harvesting of crops such as dry beans, peas, milo, canola, and sunflowers due to heads or pods shattering or falling below the cutter bar. Dry, fragile seed pods often shatter when contacted by the harvesting equipment before they are on the header, and the shattered pods spill their seeds to fall on the ground. Seeds fall from the shattered pods down through the knife to the ground. While this problem of shattering seed pods and heads is more severe in some crops than others, there is generally at least some shattering loss in any crop.

Seed pans have been developed that attach to the front edge of the header and extend forward of the knife. The pans are spaced to form slots between the pans. The crop plants pass along the slots and are cut by the knife at the rear end of the slots. Seeds falling from the plants are caught in the pans and work their way rearward and onto the knife. Such seed pans are disclosed for example in U.S. Pat. Nos. 2,575,120 to Peel and 6,032,445 to Heintzman. The top surfaces of the pans are flat, with raised side walls to keep the seeds on the pan. The pans are configured to slope downward from front to rear so that the seeds move down the sloping surface onto the header and into the harvester.

These seed pans are configured so that the slots between the pans are spaced to match the row spacing of the crops being harvested. Thus a large part of the knife is covered and not used. The Peel pans are rounded from a point in the center of the front end to guide the plant stalks into the slots. The leading ends of the Heintzman pans are pointed, and have different tapers on each side, and every other pan is shorter than the intermediate pans. The side edges on each catch pan taper from the point, located in the center of the pan, at different angles on the opposite edges such that the tapered edges on each pan are different length. Heintzman states that this configuration provides different loads and positioning on the stalks as they are moved to aid in guiding the grain stalks into the slot between adjacent pans.

The Peel and Heintzman pans have their front points in the center of the pan so that plant stalks that are contacted by the pan are moved substantially equally to each side of the pan. In both as well, the seed pans are mounted so that a guard finger is in the center of the rear end of the slot.

U.S. Pat. No. 5,105,610 to Britten discloses crop stalk guides for attachment to a harvest header in solid seeded crops where plants are in narrow rows which are not followed when harvesting, as the harvester drives without regard to the rows, and the plants are considered to be spread generally evenly across the width of the header. The Britten guides do not appear to catch falling seeds, as the guides comprise plates with flat top surfaces which have no walls to prevent seeds from falling off, but rather are simply used to guide the crop stalks into the knife. A plate is mounted to the tops of two adjacent guard fingers and extends forward. The plates are mounted to the guards such that all guard fingers are covered by a plate, and the ends of the slots lie between adjacent guard fingers.

The plates have a point in the middle of the front end and guide the contacted stalks equally to each side and along a slot between the plates to the knife. The slots are much narrower than the spacing between the guard fingers, so at the rear ends of the slots where the knife is located, the plates must be notched so that the outer edges of the guard fingers are exposed to the knife sections to allow the knife sections to shear the stalks against the guard fingers.

SUMMARY OF THE INVENTION

It is an object of the present invention to provide a seed pan apparatus that overcomes problems in the prior art.

In a first embodiment the present invention provides a seed pan apparatus comprising an elongated seed pan plate with substantially parallel right and left edges, the plate having a curved configuration such that the plate curves downward from the right edge thereof to a bottom center portion thereof and curves upward from the bottom center portion to the left edge thereof, and having a pointed front end formed by right and left front tapering sides. An engagement mechanism is located on a bottom of the seed pan plate and adapted for attachment to a cutting header of an agricultural harvester such that the seed pan plate is above a guard finger, the pointed front end is forward of the guard finger, a rear end of the plate is rearward of a knife assembly of the header, and the plate is inclined downward from front to rear. The seed pan plates and engagement mechanisms are configured such that a plurality of plates can be attached to the cutting header at spaced intervals such that an open slot is defined between the right edge of one plate and the left edge of an adjacent plate.

In a second embodiment the present invention provides a cutting header apparatus for an agricultural harvester. The apparatus comprises a knife assembly comprising a knife bar extending along a front lower edge of a cutting header, with triangular knife sections attached along the bar such that the apex of the triangle extends forward from the bar, and a plurality of guards attached at regular intervals to the front lower edge of the header, the guards comprising pointed guard fingers extending forward. A plurality of seed pans are attached to the cutting header, each seed pan comprising an elongated seed pan plate with substantially parallel right and left edges, the plate having a curved configuration such that the plate curves downward from the right edge thereof to a bottom center portion thereof and curves upward from the bottom center portion to the left edge thereof, and having a pointed front end formed by right and left front tapering sides. An engagement mechanism is located on a bottom of the seed pan plate and is attached to the cutting header such that the seed pan plate is above two adjacent guard fingers, the pointed front end is forward of the guard fingers, a rear end of the plate is rearward of the knife assembly, and the plate is inclined downward from front to rear. The seed pans are attached to the cutting header at spaced intervals such that an open slot is defined between the right edge of one plate and the left edge of an adjacent plate.

In a third embodiment the present invention provides a cutting header apparatus for an agricultural harvester. The apparatus comprises a knife assembly comprising a knife bar extending along a front lower edge of a cutting header, with triangular knife sections attached along the bar such that the apex of the triangle extends forward from the bar, and a plurality of guards attached at regular intervals to the front lower edge of the header, the guards comprising pointed guard fingers extending forward. A plurality of seed pans are attached to the cutting header, each seed pan comprising an elongated seed pan plate with substantially parallel right and left edges and having a pointed front end offset from a centerline of the plate toward a first side of the plate and formed by right and left front tapering sides, and an engagement mechanism located on a bottom of the seed pan plate and attached to the cutting header such that the seed pan plate is above two adjacent guard fingers, the pointed front end is forward of the guard fingers, a rear end of the plate is rearward of the knife assembly, and the plate is inclined downward from front to rear. The seed pans are attached to the cutting header at spaced intervals such that open slots are defined between the right edge of one plate and the left edge of an adjacent plate, and such that the slots lie between edges of adjacent right and left plates, and the slots lie between adjacent right and left guard fingers that are below the right and left plates. The right and left edges of each plate are parallel to each other from front ends thereof to rear ends thereof located at a rear end of the seed pan plate, and wherein the plates and engagement mechanisms are configured such that the right and left edges of each plate are above and in proximity to outer edges of the guard fingers under the plate The seed pan of the invention in the curved configuration concentrates the seeds falling on the pan in a bottom center portion of the pan and where material moving over the pan can more readily move the seeds rearward. The offset point and slot with sides adjacent to outer edges of the guards guides crop stalks more smoothly to the knife, and allows the knife sections to readily shear the stalks against the outer edges of the guard fingers. The inclination, height, and fore and aft position of the seed pan can be adjusted to suit varying conditions of crop, moisture, soil, and the like, or to suit different harvesting machines.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE
ILLUSTRATED EMBODIMENTS

Figure 1:
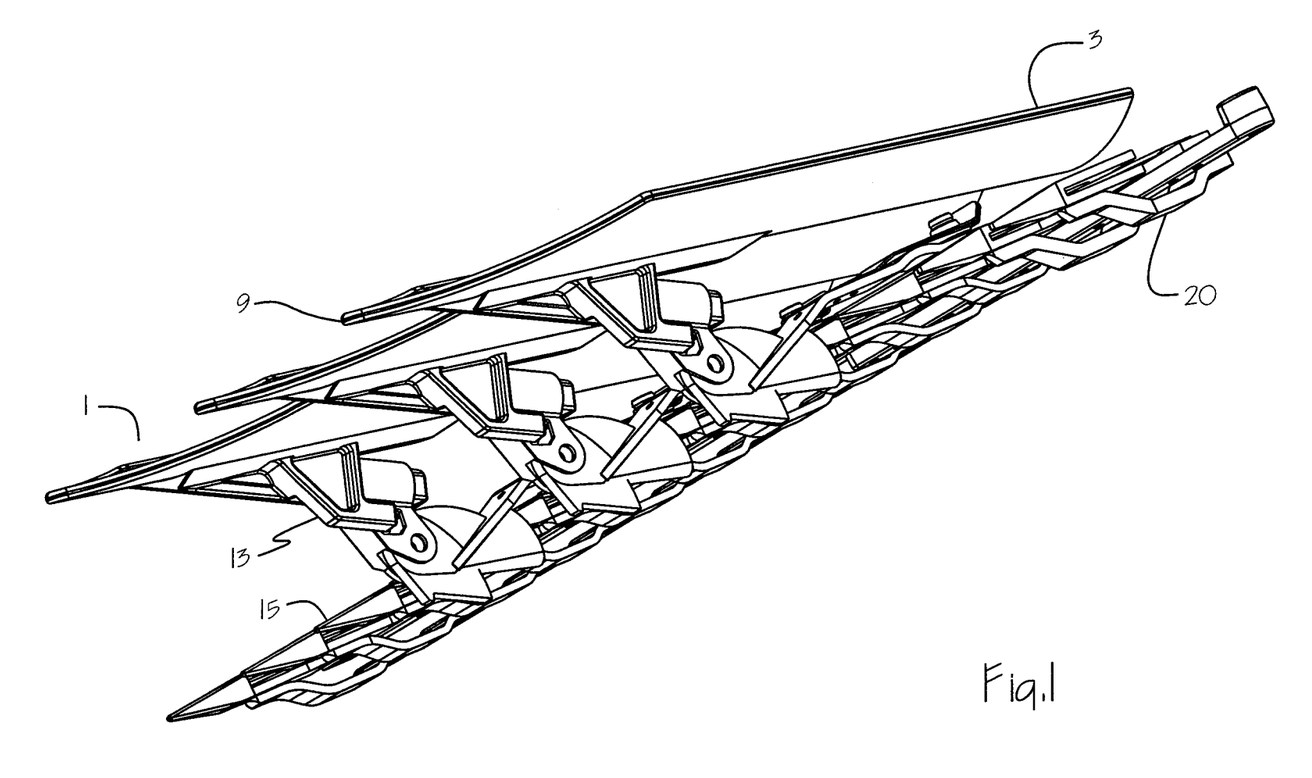
FIG. 1 is a bottom front perspective view of three of the same embodiments of a seed pan apparatus of the present invention mounted on the knife assembly of cutting header of an agricultural harvester.
Figure 2:
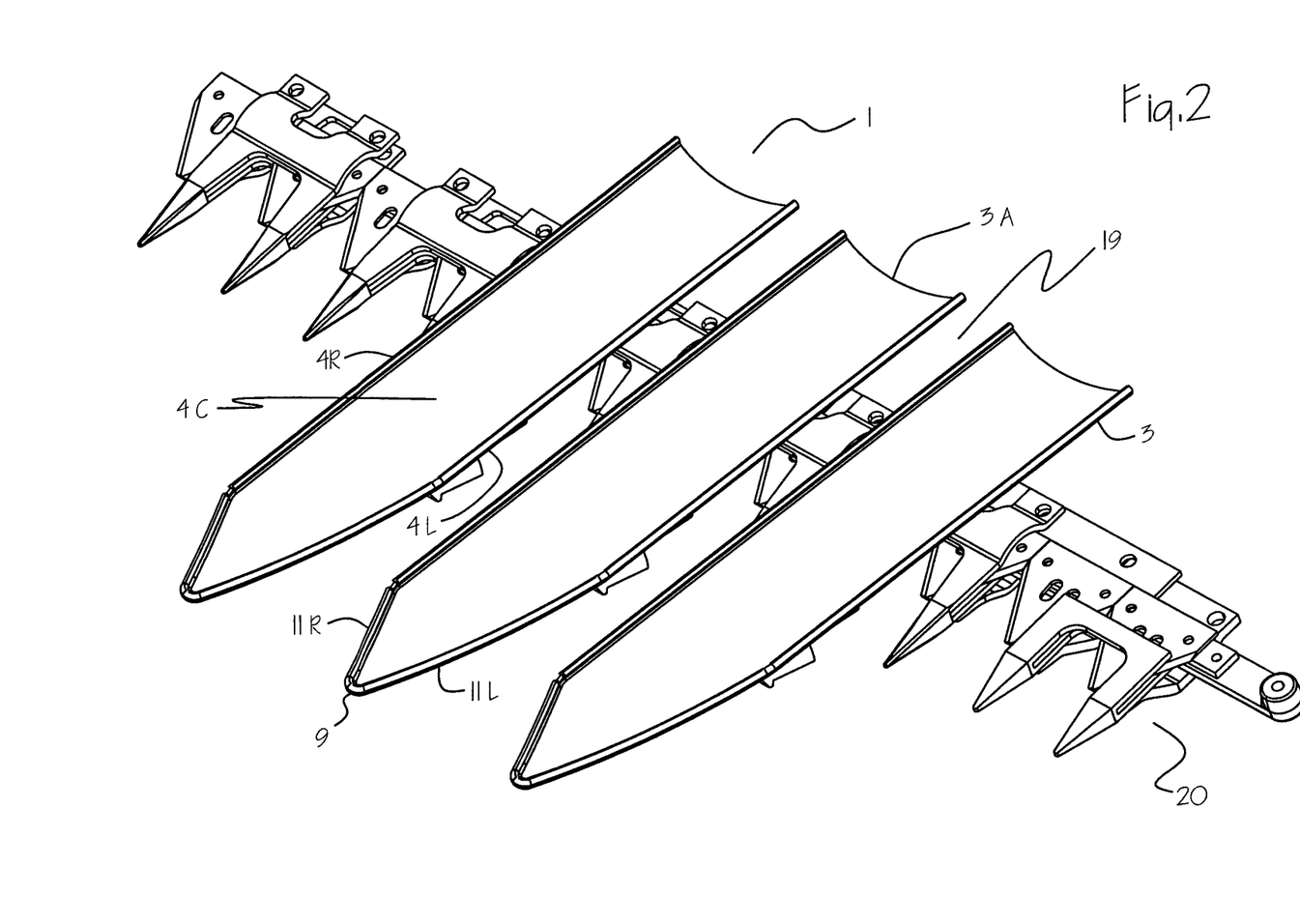
FIG. 2 is a top front perspective view of the mounted embodiments of FIG. 1.

FIGS. 1-4 illustrate an embodiment of a seed pan apparatus 1 of the present invention. The apparatus 1 comprises an elongated seed pan plate 3 with substantially parallel right and left edges 4R, 4L. The plate 3 has a curved configuration such that the plate 3 curves downward from the right edge 4R thereof to a bottom center portion 4C thereof and curves upward from the bottom center portion 4C to the left edge 4L thereof, as best seen in FIG. 2. The illustrated plate 3 has a smoothly curved shape however it is contemplated that the plate could be curved with spaced ridges as in the plate 103 schematically illustrated in FIG. 5.

Figure 5:
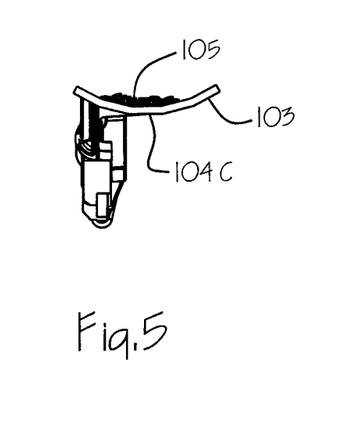
FIG. 5 is a schematic cross sectional view of an alternate seed pan plate.

When seeds 105 fall onto the top surface of either curved plate 3, 103 they are concentrated, as illustrated in FIG. 5, in the bottom portion 104C of the plate 103. The seeds 105 then are more likely to be moved rearward with the other crop material moving rearward onto the cutting header of the agricultural harvester to which same are attached as described below.

The plates 3 have a point 9 at the front end formed by right and left front tapering sides 11R, 11L.

An engagement mechanism 13 is located on a bottom of the seed pan plate 3 and is adapted for attachment to the cutting header 7 of an agricultural harvester such that the seed pan plate 3 is above a guard finger 15. The pointed front end 9 is forward of the guard finger 15 and a rear end of the plate 3 is rearward of the knife assembly 20 of the header 7. In the illustrated apparatus 1, the engagement mechanism 13 is configured to attach to the front end of the guard finger 15 and the bolt attaching the guard finger as is known in the prior art. Other attachment means could also be used to attach the plate to the cutting header in the configuration required.

Figure 3:
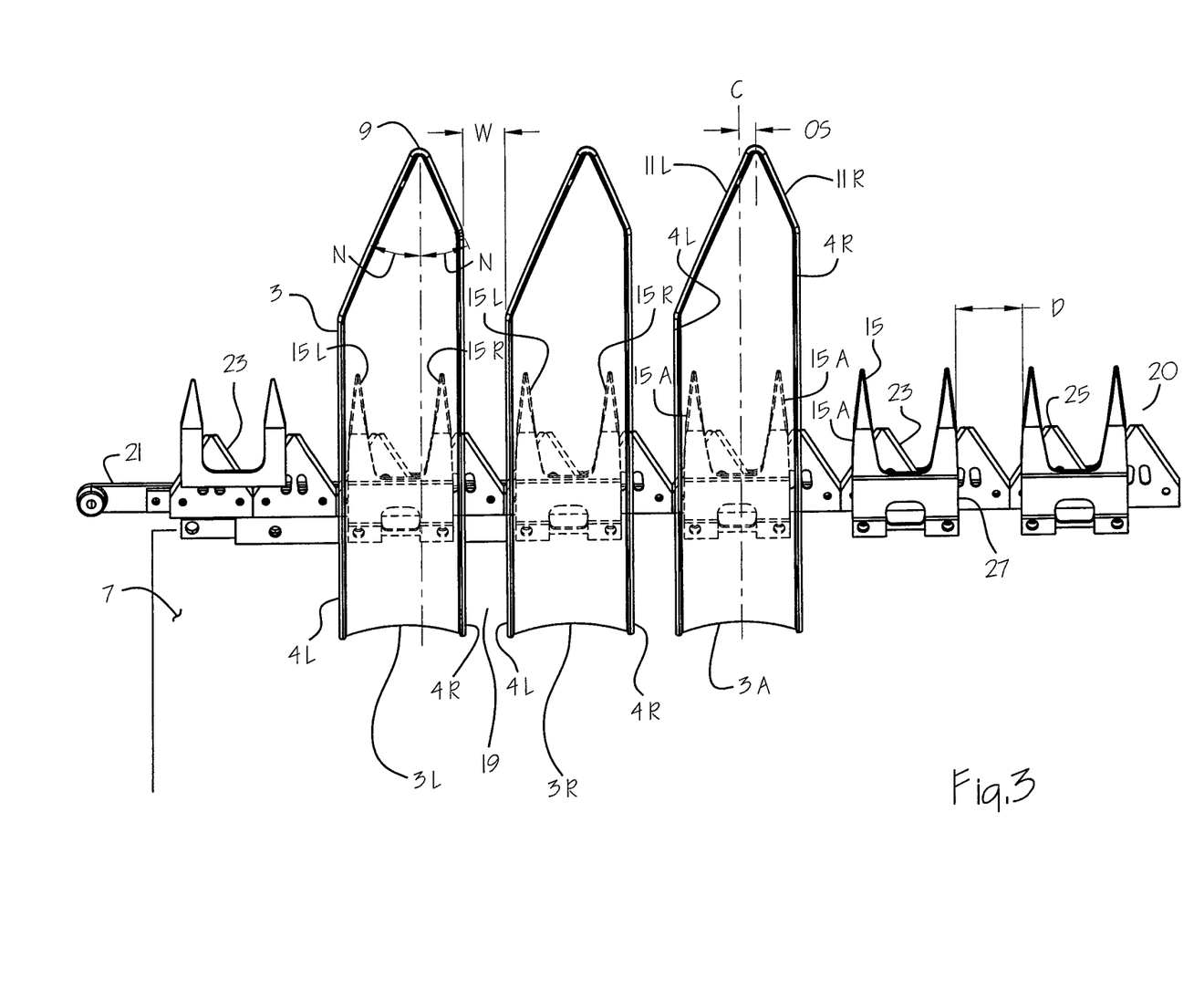
FIG. 3 is a top view of the mounted embodiments of FIG. 1.

The seed pan plates 3 are configured such that a plurality of plates 3 can be attached to the cutting header 7 at spaced intervals such as illustrated in FIGS. 1-3 such that an open slot 19 is defined between the right edge 4R of one plate and the left edge 4L of an adjacent plate.

The seed pan plates 3 and engagement mechanisms 13 are configured such that each plate 3 lies above two adjacent guard fingers 15R, 15L and such that the slots 19 lie between right and left edges of adjacent right and left plates 3R, 3L, and the slots 19 lie between adjacent right and left guard fingers 15R, 15L that are below the right and left plates 3R, 3L, as illustrated in FIG. 3. Thus there is no guard finger in the slot 19. The width W of the slot 19 is only slightly less than the spacing D between the outer edges of the adjacent guard fingers 15R, 15L.

Figure 4:
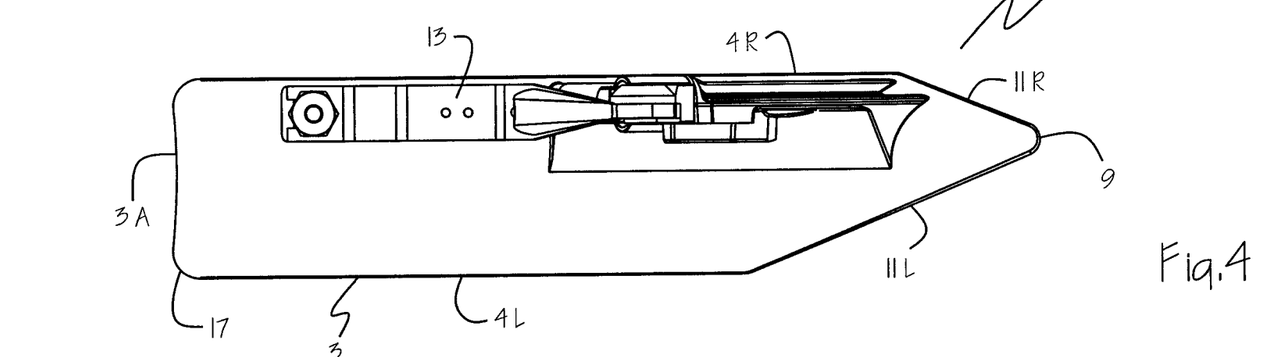
FIG. 4 is a bottom view of a single embodiment as shown in FIG. 1.
Figure 6:
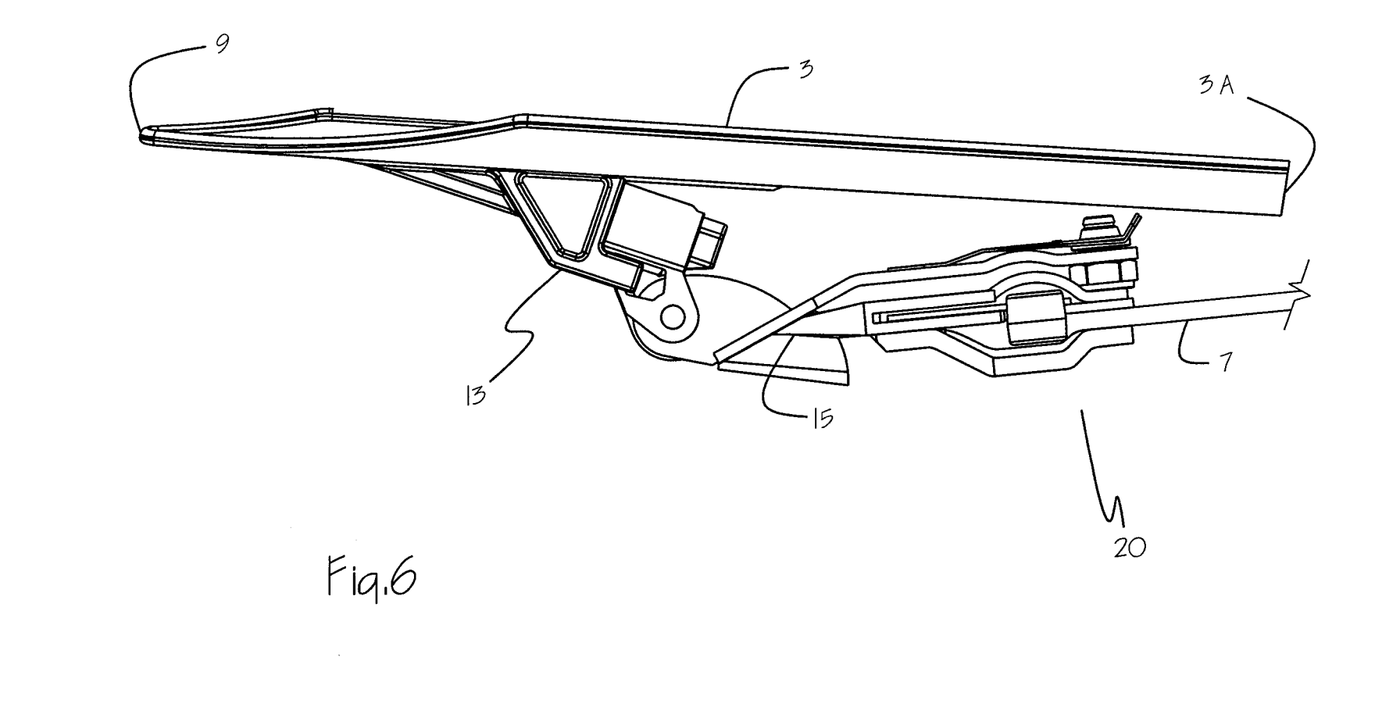
FIG. 6 is a schematic side view showing the mounting of the embodiment of FIG. 1 on the cutting header.

The right and left edges 4R, 4L of each plate 3 are parallel to each other from front ends thereof to rear ends thereof located at a rear end 3A of the seed pan plate 3. As seen in FIG. 4, the rear corners 17 of the plates 3 can be rounded. The plates 3 and engagement mechanisms 13 are configured such that the right and left edges 4R, 4L of each plate 3 are above and in proximity to outer edges 15A of the guard fingers 15 under the plate 3. As schematically illustrated in FIG. 6 the point 9 at the front end is forward of the guard fingers 15, and the rear end 3A of the plate 3 is rearward of the knife assembly 20 and above the cutting header 7. The plate is inclined so that the point 9 at the front end is higher than the rear end 3A so that seeds falling on the plate will move rearward down the sloping plate 3 and onto the header 7.

The knife assembly 20 of the cutting header 7 comprises a knife bar 21 extending along a front lower edge of a cutting header 7 with triangular knife sections 23 attached along the bar such that the apex 25 of the triangle extends forward from the bar 21. The sections 23 pass back and forth through lateral slots in the guard fingers 15 of guards 27 attached at regular intervals to the front lower edge of the header 7 with the guard fingers 15 extending forward. Thus the crop stalks passing down the slot 19 can be sheared by the knife sections 23 against the outer edges 15A of the guard fingers 15 that are under the plates 3 on either side of the slots 19, and close to the edges 4R, 4L of the plate 3.

Figure 7:
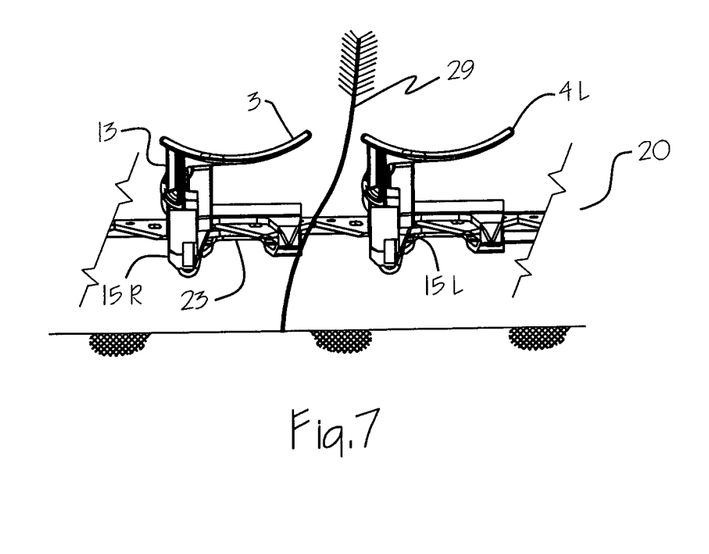
FIG. 7 is a schematic sectional front view of the mounting of the embodiment of FIG. 1 on the cutting header.

As schematically illustrated in the front view of FIG. 7, the plate 3 is some distance above the knife assembly 20 and is attached only to the right guard finger 15R. A bent plant stalk 29 can move along the left edge 4L of the plate 3 but be in the position illustrated where same is not on the left side of the left guard finger 15L, as are most of the plant stalks passing down the slot between the plates, but rather on the right side of the left guard finger. Since the plate 3 is above the guard finger 15L, the plant stalk can pass below the plate 3 as illustrated, and be cut under the plate 3 by the knife section 23 shearing the stalk 29 against the right side of the guard finger 15L. Thus that portion of the knife assembly 20 that is under the plate 3 is not rendered completely inoperative as is generally the case in the prior art.

In the illustrated apparatus 1, the front point 9 is offset a distance OS from a center C of the seed pan plate 3 toward the right edge 4R of the plate 3. It is contemplated that the point 9 could as well be offset toward the left edge 4L. The right and left front tapering sides 11R, 11L are oriented at the same angle N with the result that the left front tapering side 11L is longer than the right front tapering side 11R, and the left edge 4R is thus also shorter than the right edge 4L. The majority of the crop stalks thus are guided down the longer left front tapering side 11L where they meet the right edge 4R, and the smaller proportion of stalks that are moving along the shorter right front tapering side 11R, where the stalks merge and pass into the slot 19. It has been found that this arrangement smoothes the flow of stalks into the slot 19. In the prior art with the points in the center the stalks meet at the entrance to the slot 19 and must arrange themselves to enter the slot.

In contrast in the present arrangement the smaller proportion of stalks are already riding along the longer right edge 4R of the plate 3, when the larger proportion meets them at the start of the slot 19. The larger proportion of stalks has arranged themselves by then along the longer left tapering front side 11L, the smaller number of stalks approaching directly into the slot along the right edge 4R merge smoothly as the stalks riding along the longer left front side 11L make the turn into the slot 19.

It is contemplated that it will be desired to utilize the seed pan apparatus of the present invention in a wide variety of crop conditions, weather conditions, soil conditions and the like. Varying conditions can change the way the crop plants react to the passing of the seed pan apparatus through the crop, and so it is desirable to design the engagement mechanism to provide adjustment of orientation of the seed pan apparatus with respect to the soil and crop. Similarly the apparatus will be used on a wide variety of harvesting machines in a variety of configurations with different angles and sizes and the like.

Figure 11:
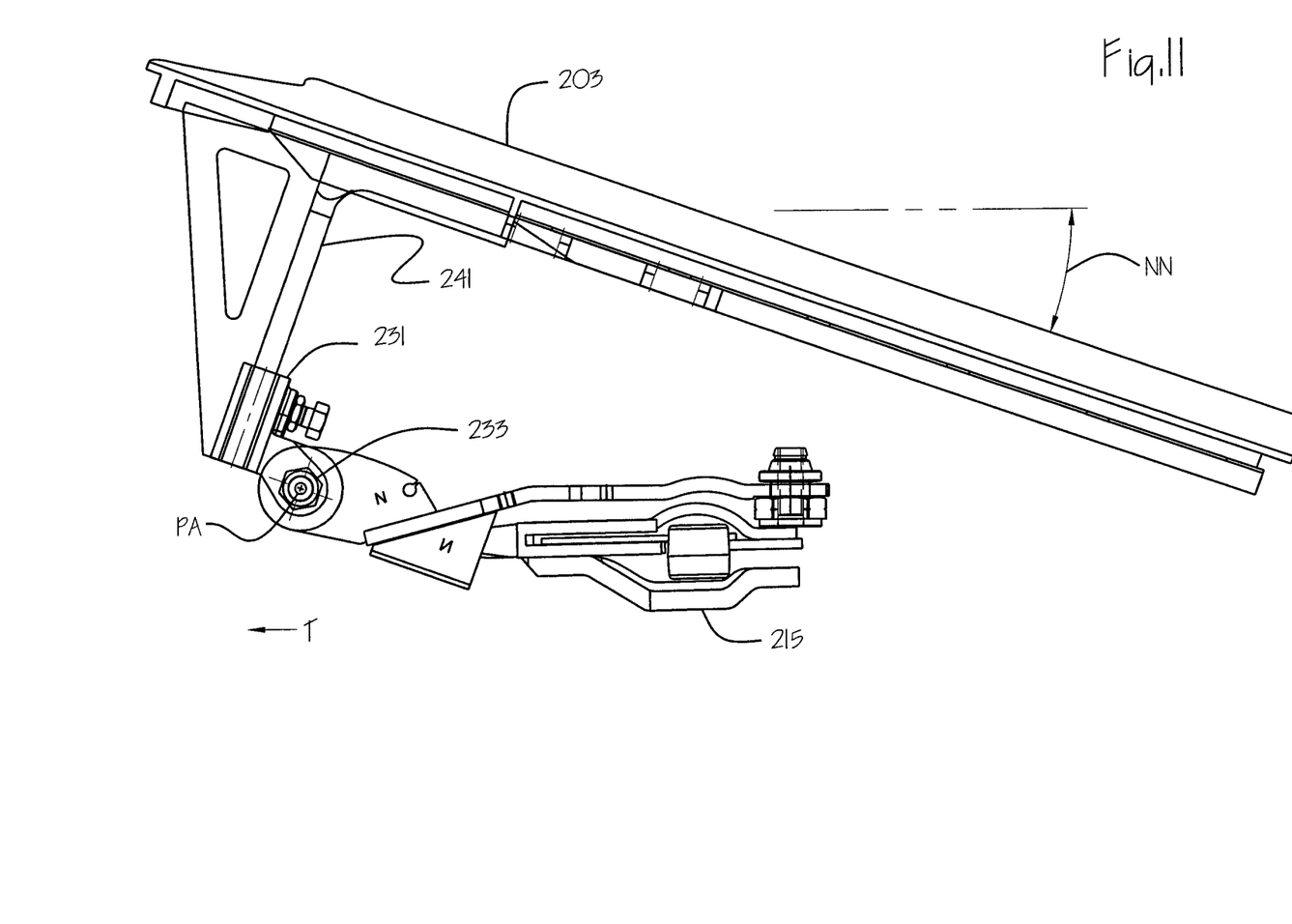
FIG. 11 shows a side view of the embodiment of FIG. 8 mounted on a guard finger, with tilted to a position inclined downward from front to back.

FIGS. 8-11 illustrate an alternate embodiment of a seed pan apparatus 201 of the present invention where the engagement mechanism 213 is again configured to attach to the front end of a guard finger 215 as is known in the prior art. The illustrated engagement mechanism 213 provides adjustment of the distance H the seed pan plate 203 is above the guard finger 215 as illustrated in FIGS. 9A to 9C and adjustment of the fore and aft position of the seed pan plate 203 with respect to the guard finger 215 from position P1 to position P2 as illustrated in FIGS. 10A and 10B. Adjustment of the angle NN of downward inclination of the seed pan plate 203 from front to rear is also provided as illustrated in FIG. 11.

Figure 8:
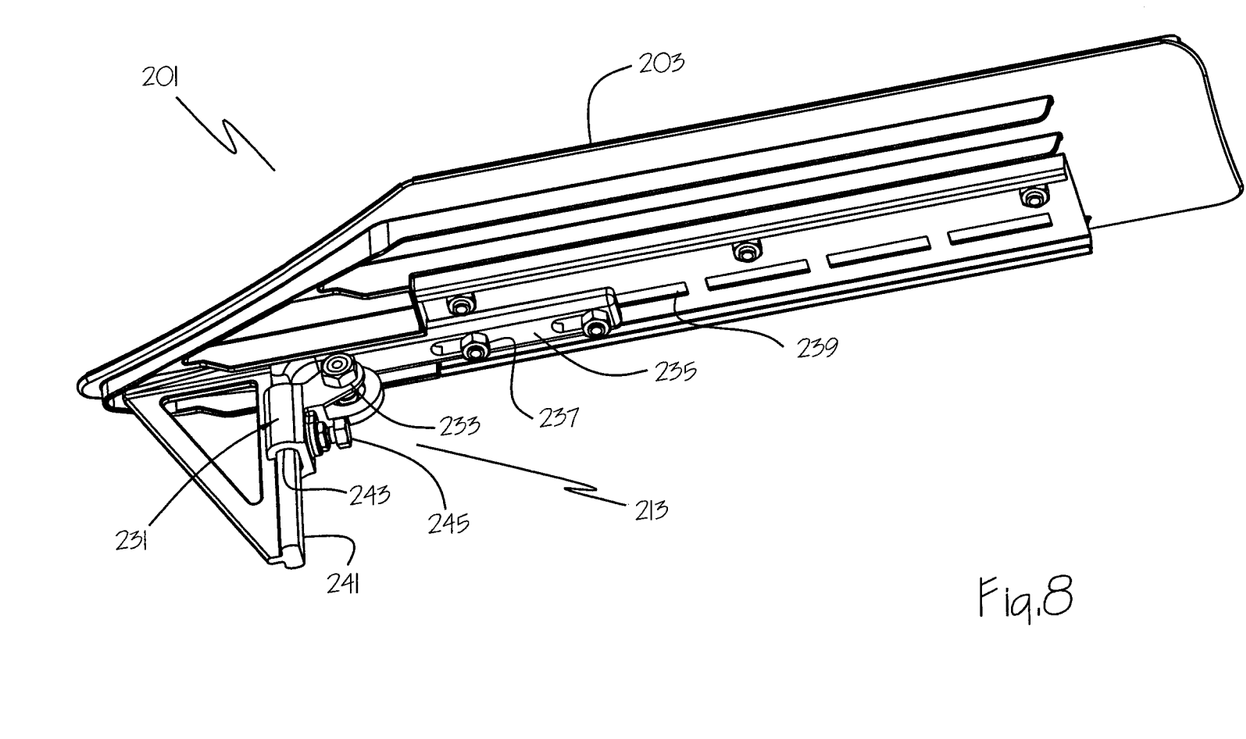
FIG. 8 is a bottom front perspective view of an alternate embodiment of a seed pan apparatus of the present invention.

The engagement mechanism 213 comprises a receptor 231 pivotally attached to a guard finger about a pivot axis PA oriented substantially horizontal and perpendicular to an operating travel direction T of the cutting header, and a pivot lock operative to lock the receptor 231 with respect to the guard finger 215. In the illustrated engagement mechanism 213 the pivot lock is provided a pivot bolt 233. The pivot bolt 233 is loosened to position the seed pan plate 203 at a desired angle of inclination NN and then tightened to lock the seed pan plate at the desired angle.

A plate bracket 235 is attached to a bottom of the seed pan plate 203 by bolts 237 through slots 239 in the bottom of the seed pan plate 203. The bolts 237 can be positioned along the slots 239, and in a desired one of the slots 239, such that the fore and aft position of the seed pan plate 203 with respect to the plate bracket 235 can be adjusted, moving the seed pan plate 203 fore and aft with respect to the guard finger 215.

Figure 9A:
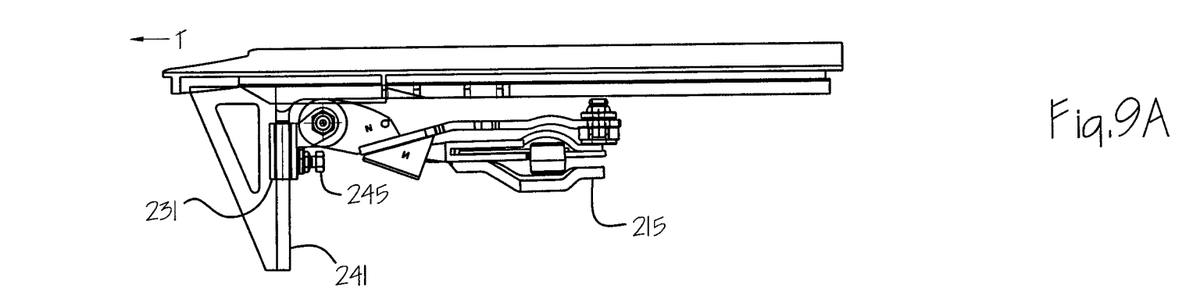
FIGS. 9A-9C show side views of the embodiment of FIG. 8 mounted on a guard finger, with the seed pan plate adjusted to different heights above the guard finger.
Figure 9B:
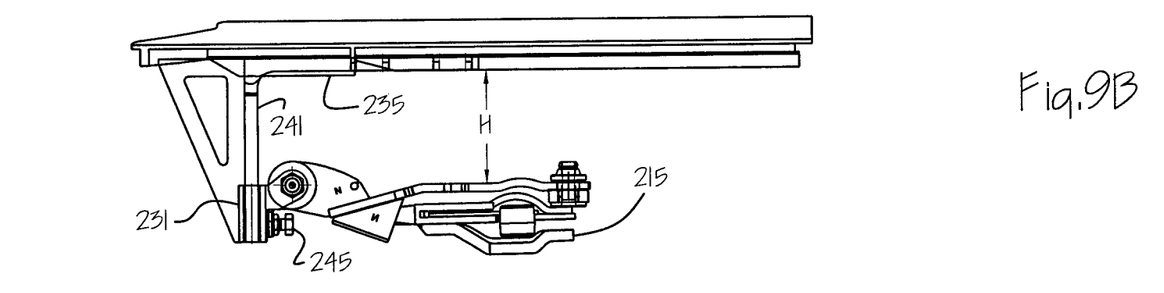
Figure 9C:
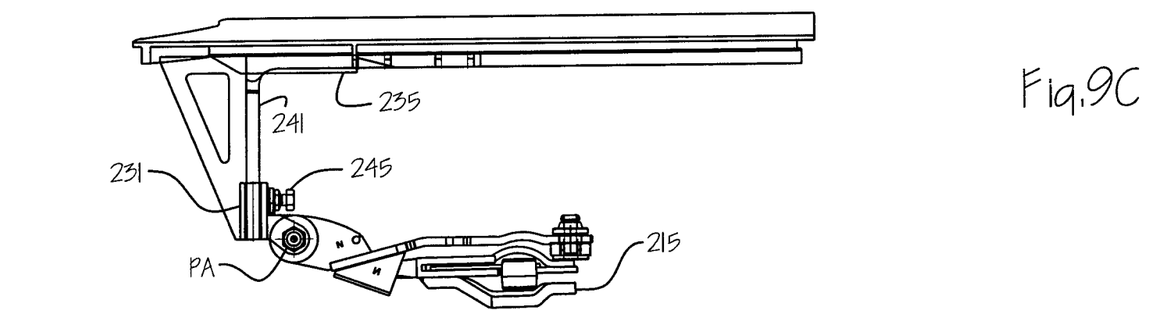
Figure 10A:
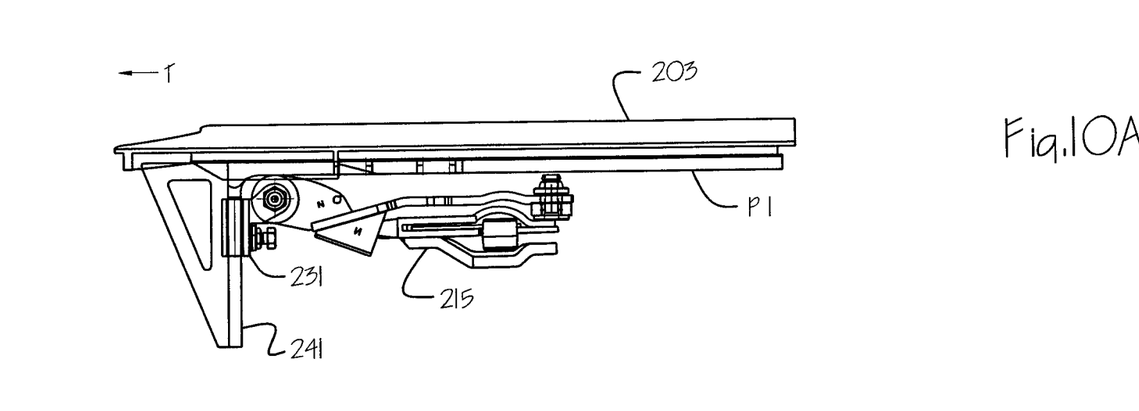
FIGS. 10A-10B show side views of the embodiment of FIG. 8 mounted on a guard finger, with the seed pan plate adjusted to different fore and aft positions.
Figure 10B:
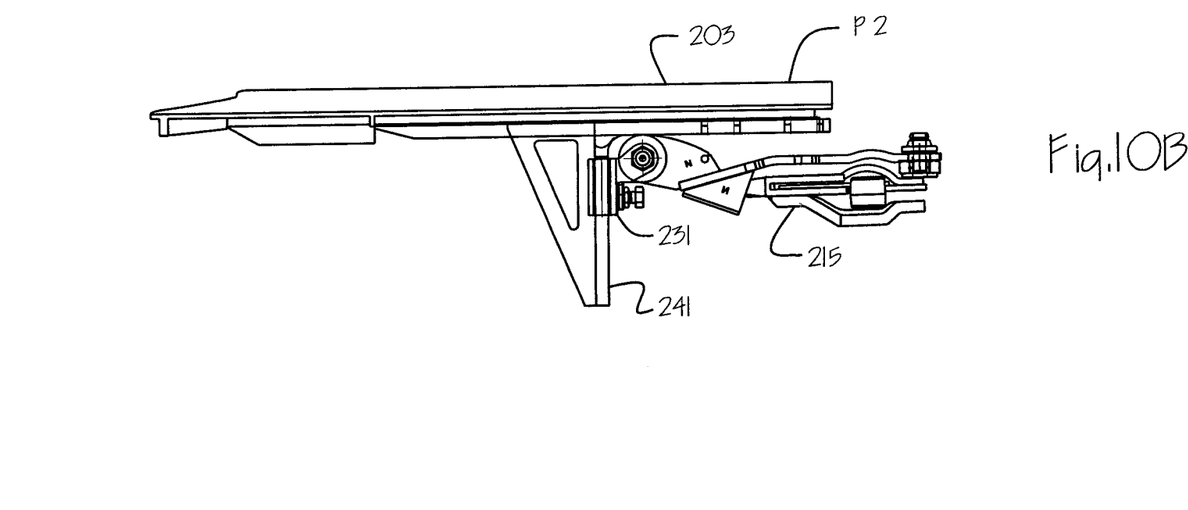

A post 241 extends downward from a front portion of the plate bracket 235 and is slidingly engaged in a recess 243 in the receptor 231 such that the post 241 can move up and down with respect to the receptor 231, and a post lock operative to lock the post with respect to the receptor. In the illustrated engagement mechanism 213 the post lock is provided a post bolt 245. The post bolt 245 is loosened to position the seed pan plate 203 at a desired distance above the guard finger 215 and then tightened to lock the seed pan plate 203 at the desired location. The receptor 231 can also be reversed from the position of FIG. 9B to the position of 9C by removing the pivot bolt 233 to provide a further range of vertical movement for the post 241.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seed pan apparatus comprising:
   an elongated seed pan plate with substantially parallel right and left edges, a top surface of the plate having a curved configuration such that the top surface of the plate curves downward from the right edge thereof to a bottom center portion thereof and curves upward from the bottom center portion to the left edge thereof, and having a pointed front end formed by right and left front tapering sides;
   an engagement mechanism located on a bottom of the seed pan plate and adapted for attachment to a cutting header of an agricultural harvester such that the seed pan plate is above a guard finger, the pointed front end is forward of the guard finger, a rear end of the plate is rearward of a knife assembly of the header, and the plate is inclined downward from front to rear;
   wherein the seed pan plates and engagement mechanisms are configured such that a plurality of plates can be attached to the cutting header at spaced intervals such that an open slot is defined between the right edge of one plate and the left edge of an adjacent plate.

2. The apparatus of claim 1 wherein a front point of the pointed front end is offset from a center of the seed pan plate toward one of the right and left edges of the plate.

3. The apparatus of claim 2 wherein the right and left front tapering sides are oriented at the same angle such that one front tapering side is longer than the other front tapering side, and a corresponding short edge on the longer front tapering side of the seed pan plate is shorter than a corresponding long edge on the shorter front tapering side of the plate.

4. The apparatus of claim 3 wherein the seed pan plates and engagement mechanisms are configured such that each plate lies above only two adjacent guard fingers.

5. The apparatus of claim 4 wherein the seed pan plates are mounted to the header such that the slots lie between edges of adjacent right and left seed pan plates, and the slots lie between adjacent right and left guard fingers that are below the right and left seed pan plates.

6. The apparatus of claim 5 wherein the right and left edges of each seed pan plate are parallel to each other from front ends thereof to rear ends thereof located at a rear end of the seed pan plate, and wherein the plates and engagement mechanisms are configured such that the right and left edges of each seed pan plate are above and in proximity to outer edges of the right and left guard fingers under the plate.

7. The apparatus of claim 1 wherein the engagement mechanism is operative to provide adjustment of at least one of:
   an angle of downward inclination of the seed pan plate from front to rear;
   a distance the seed pan plate is above the guard finger; and
   a fore and aft position of the seed pan plate with respect to the guard finger.

8. The apparatus of claim 7 wherein the engagement mechanism comprises:
   a receptor adapted to be pivotally attached to a guard finger about a pivot axis oriented substantially horizontal and perpendicular to an operating travel direction of the cutting header, and a pivot lock operative to lock the receptor with respect to an attached guard finger;
   a plate bracket attached to a bottom of the seed pan plate such that a fore and aft position of the seed pan plate with respect to the plate bracket can be adjusted;
   a post extending downward from a front portion of the plate bracket and slidingly engaged in a recess in the receptor such that the post can move up and down with respect to the receptor, and a post lock operative to lock the post with respect to the receptor.

9. A cutting header apparatus for an agricultural harvester, the apparatus comprising:
   a knife assembly comprising a knife bar extending along a front lower edge of a cutting header, with triangular knife sections attached along the bar such that the apex of the triangle extends forward from the bar, and a plurality of guards attached at regular intervals to the front lower edge of the header, the guards comprising pointed guard fingers extending forward;
   a plurality of seed pans, each seed pan comprising:
      an elongated seed pan plate with substantially parallel right and left edges, a top surface of the plate having a curved configuration such that the top surface of the plate curves downward from the right edge thereof to a bottom center portion thereof and curves upward from the bottom center portion to the left edge thereof, and having a pointed front end formed by right and left front tapering sides;
      an engagement mechanism located on a bottom of the seed pan plate and attached to the cutting header such that the plate is above only two adjacent guard fingers, the pointed front end is forward of the guard fingers, a rear end of the plate is rearward of the knife assembly, and the plate is inclined downward from front to rear;
      wherein the seed pans are attached to the cutting header at spaced intervals such that an open slot is defined between the right edge of one plate and the left edge of an adjacent plate.

10. The apparatus of claim 9 wherein a front point of the pointed front end is offset from a center of the seed pan plate toward one of the right and left edges of the plate.

11. The apparatus of claim 10 wherein the right and left front tapering sides are oriented at the same angle such that one front tapering side is longer than the other front tapering side, and a corresponding short edge on the longer front tapering side of the seed pan plate is shorter than a corresponding long edge on the shorter front tapering side of the plate.

12. The apparatus of claim 11 wherein the slots lie between edges of adjacent right and left seed pan plates, and the slots lie between adjacent right and left guard fingers that are below the right and left seed pan plates.

13. The apparatus of claim 12 wherein the right and left edges of each seed pan plate are parallel to each other from front ends thereof to rear ends thereof located at a rear end of the seed pan plate, and wherein the seed pan plates and engagement mechanisms are configured such that the right and left edges of each seed pan plate are above and in proximity to outer edges of the right and left guard fingers under the plate.

14. The apparatus of claim 13 wherein rear corners of the seed pan plates are rounded.

15. The apparatus of claim 9 wherein the engagement mechanism is operative to provide adjustment of at least one of:
   an angle of downward inclination of the seed pan plate from front to rear;
   a distance the seed pan plate is above a guard finger; and
   a fore and aft position of the seed pan plate with respect to the guard finger.

16. The apparatus of claim 15 wherein the engagement mechanism comprises:
   a receptor pivotally attached to a guard finger about a pivot axis oriented substantially horizontal and perpendicular to an operating travel direction of the cutting header, and a pivot lock operative to lock the receptor with respect to the guard finger;

a plate bracket attached to a bottom of the seed pan plate such that a fore and aft position of the seed pan plate with respect to the plate bracket can be adjusted;

a post extending downward from a front portion of the plate bracket and slidingly engaged in a recess in the receptor such that the post can move up and down with respect to the receptor, and a post lock operative to lock the post with respect to the receptor.

* * * * *